United States Patent
Chavez et al.

(10) Patent No.: US 10,793,275 B2
(45) Date of Patent: Oct. 6, 2020

(54) ROTATABLE AND EXTENDABLE DEPLOYMENT SYSTEM

(71) Applicant: Bell Helicopter Textron Inc., Fort Worth, TX (US)

(72) Inventors: Jeremy Robert Chavez, Colleyville, TX (US); Brent Chadwick Ross, Flower Mound, TX (US)

(73) Assignee: Bell Textron Inc., Fort Worth, TX (US)

( * ) Notice: Subject to any disclaimer, the term of this patent is extended or adjusted under 35 U.S.C. 154(b) by 294 days.

(21) Appl. No.: 16/004,159

(22) Filed: Jun. 8, 2018

(65) Prior Publication Data

US 2019/0375506 A1 Dec. 12, 2019

(51) Int. Cl.
| | | |
|---|---|---|
| *B64D 7/06* | (2006.01) | |
| *B64D 1/08* | (2006.01) | |
| *B64D 1/10* | (2006.01) | |
| B64D 1/04 | (2006.01) | |
| B64C 29/00 | (2006.01) | |

(52) U.S. Cl.
CPC .................. *B64D 7/06* (2013.01); *B64D 1/08* (2013.01); *B64D 1/10* (2013.01); *B64C 29/0033* (2013.01); *B64D 1/04* (2013.01)

(58) Field of Classification Search
CPC ... B64D 7/06; B64D 1/04; B64D 1/08; B64D 1/10; B64C 29/0033
See application file for complete search history.

(56) References Cited

U.S. PATENT DOCUMENTS

| | | | | |
|---|---|---|---|---|
| 7,153,082 B2* | 12/2006 | Nolasco | ............... | B60P 3/125 |
| | | | | 414/563 |
| 2003/0192992 A1* | 10/2003 | Olsen | ................... | B64C 1/22 |
| | | | | 244/137.1 |
| 2020/0025513 A1* | 1/2020 | Wright | ................. | B64D 1/06 |

\* cited by examiner

*Primary Examiner* — Rodney A Bonnette
(74) *Attorney, Agent, or Firm* — Fogarty LLP

(57) ABSTRACT

Embodiments are directed to an aircraft, such as a tiltrotor, having an internal payload storage area. A rotatable deployment system is mounted within the payload storage area. The rotatable deployment system comprises a frame that is configured to rotate between a stowed position and a deployment position. Two extendible arms are attached to the frame, wherein each extendible arm is configured to move in opposite directions between a retracted position and a plurality of extended positions. Each extendible arm has a fixed end and a moving end. A payload mounting point on each moving end. The payload mounting point allows a payload to pan and tilt in azimuth and elevation.

20 Claims, 10 Drawing Sheets

ROTATABLE AND EXTENDABLE DEPLOYMENT SYSTEM

TECHNICAL FIELD

This invention relates generally to systems for deploying external devices on aircraft and, more particularly, to an internal mounting system that eliminates the need for external mounting points.

BACKGROUND

Aircraft often have externally mounted devices, such as weapons, fuel tanks, cameras, sensors, etc. These external devices typically require permanent hardpoints or rails on the aircraft fuselage or wings for mounting. The presence of external devices and associated hardpoints or rails disrupts airflow across the surface of the aircraft, which creates parasitic or form drag. Increased engine power is required to overcome these drag forces, which results in higher fuel consumption and lower operating efficiency.

SUMMARY

Embodiments are directed to systems and methods for stowing payload internally in an aircraft. An example aircraft, such as a tiltrotor aircraft, has an internal payload storage area. A rotatable deployment system is mounted within the payload storage area. The rotatable deployment system comprises a frame that is configured to rotate between a stowed position and a deployment position. Two extendible arms are attached to the frame, wherein each extendible arm is configured to move in opposite directions between a retracted position and a plurality of extended positions. Each extendible arm has a fixed end and a moving end. A payload mounting point on each moving end. The payload mounting point allows a payload to pan and tilt in azimuth and elevation.

The aircraft further comprises actuators that are connected between the rotatable frame and each extendible arm. The actuators are configured to move each extendible arm between the retracted position and the plurality of extended positions. The extendible arms are configured to move between the retracted position and the plurality of extended positions only if the rotatable deployment system is in the deployment position. The extendible arms may move symmetrically or asymmetrically.

Openings to the internal payload storage area are located on opposite sides of the aircraft fuselage. The openings are positioned to allow the moving ends of the extendible arms to extend outside the aircraft. Doors are configured to cover the openings.

A payload is coupled to each payload mounting point. The payload may comprise one or more of a camera, a thermal imaging sensor, a targeting pod, a loud speaker, a spotlight, and/or a weapon. A selected payload may be positioned between the aircraft fuselage and a proprotor arc when the aircraft operates in airplane mode and/or between the aircraft fuselage and a proprotor downwash when the aircraft operates in helicopter mode.

BRIEF DESCRIPTION OF THE DRAWINGS

Figure 1:
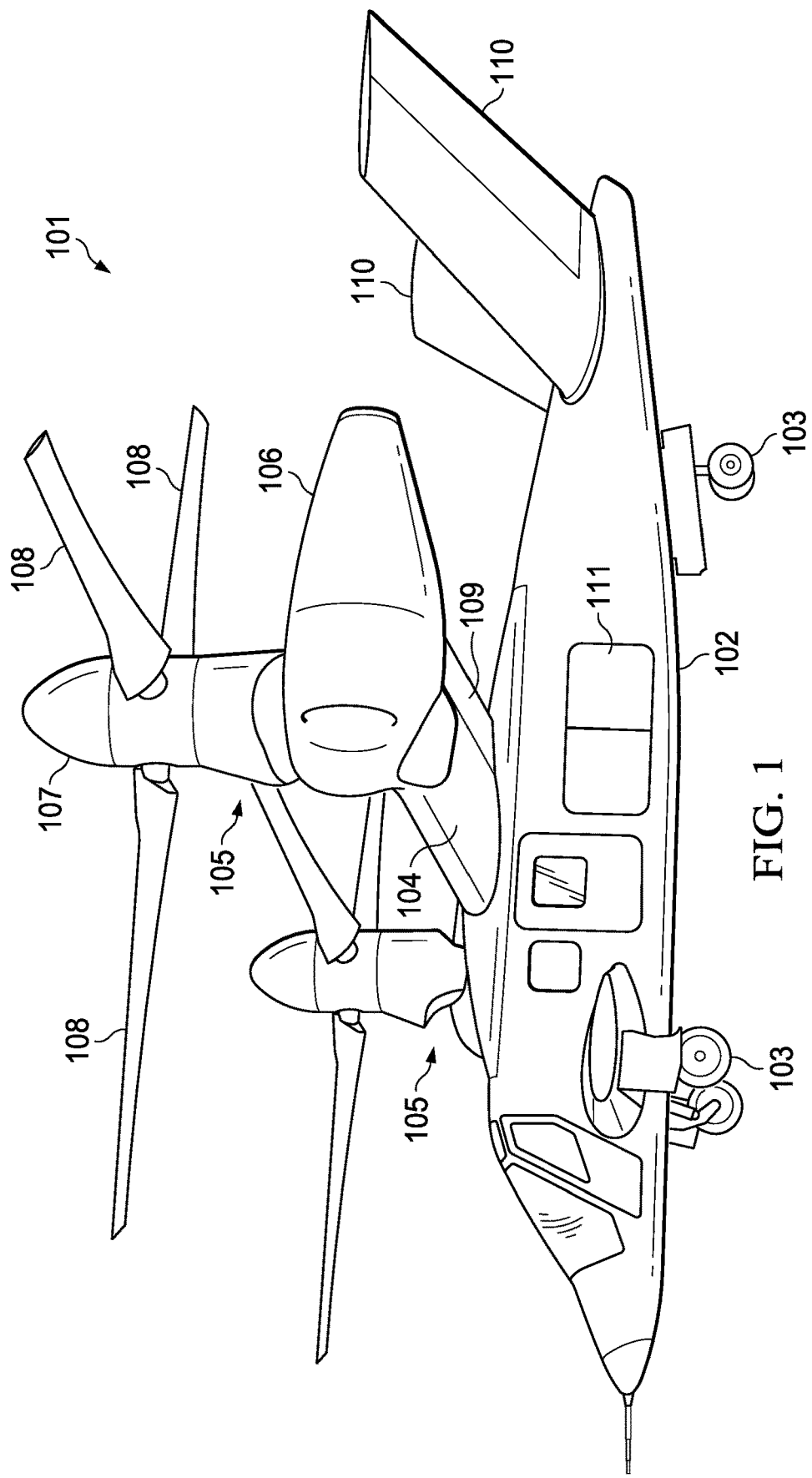

Having thus described the invention in general terms, reference will now be made to the accompanying drawings, which are not necessarily drawn to scale, and wherein:

FIG. 1 illustrates an aircraft that may be used with some embodiments of an internal payload stowage system as disclosed herein.

Figure 2:
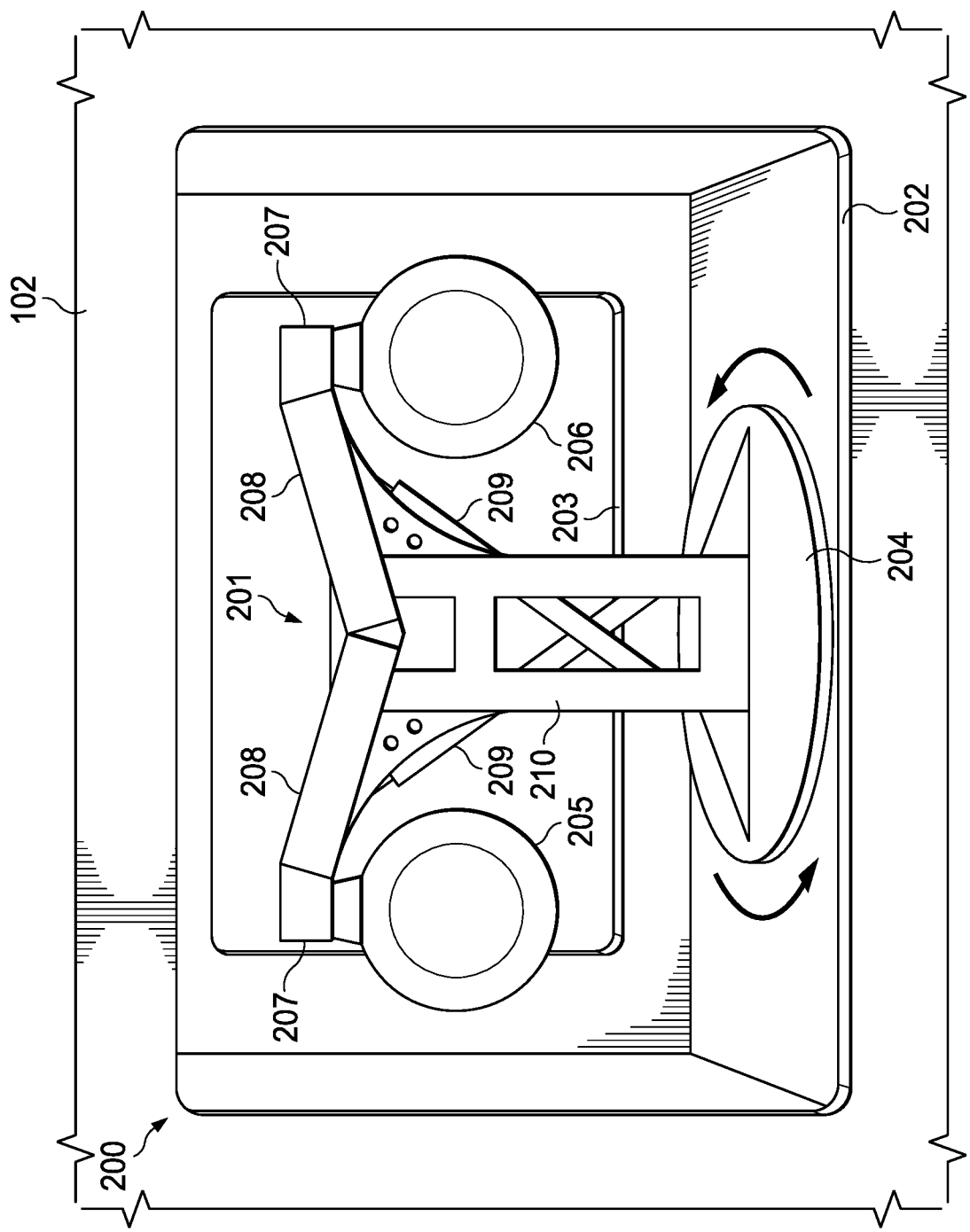

FIG. 2 is a side-view of an aircraft illustrating an internal storage area having a payload stowage system.

Figure 3:
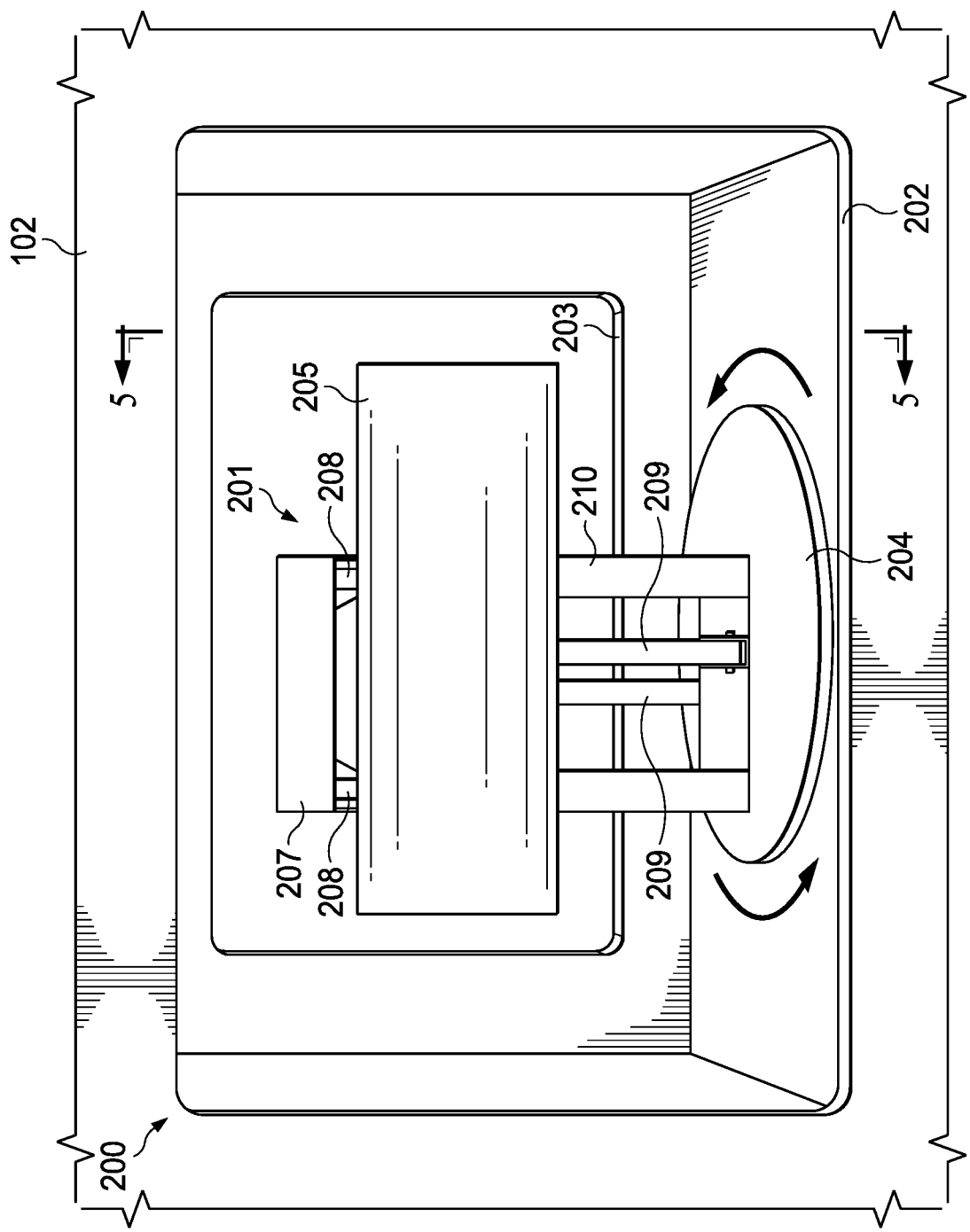

FIG. 3 is a side-view of the payload stowage system shown in FIG. 2

Figure 4:
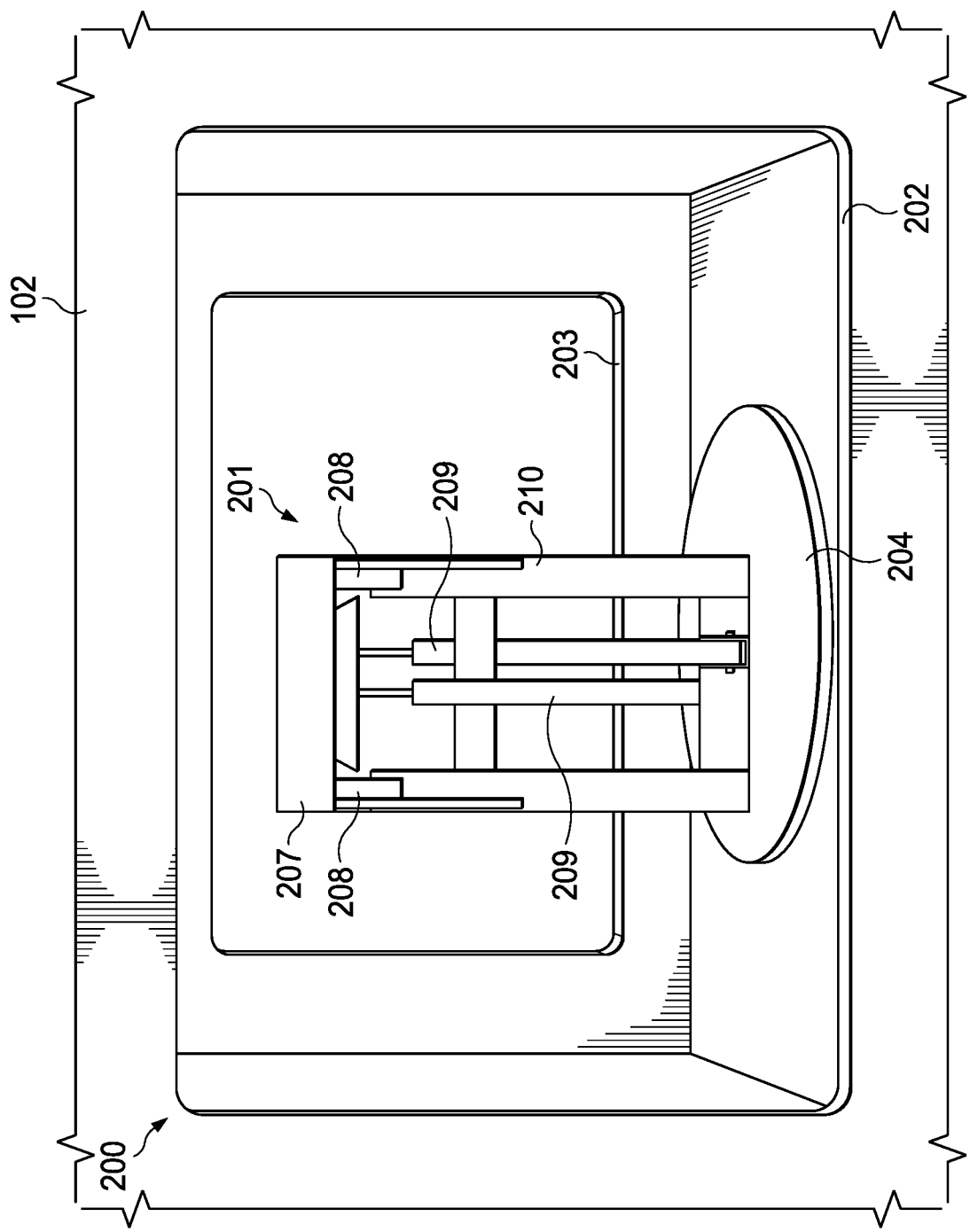

FIG. 4 is a side-view of the payload stowage system in which the payloads are removed to illustrate an arrangement of the components according to one embodiment.

Figure 5:
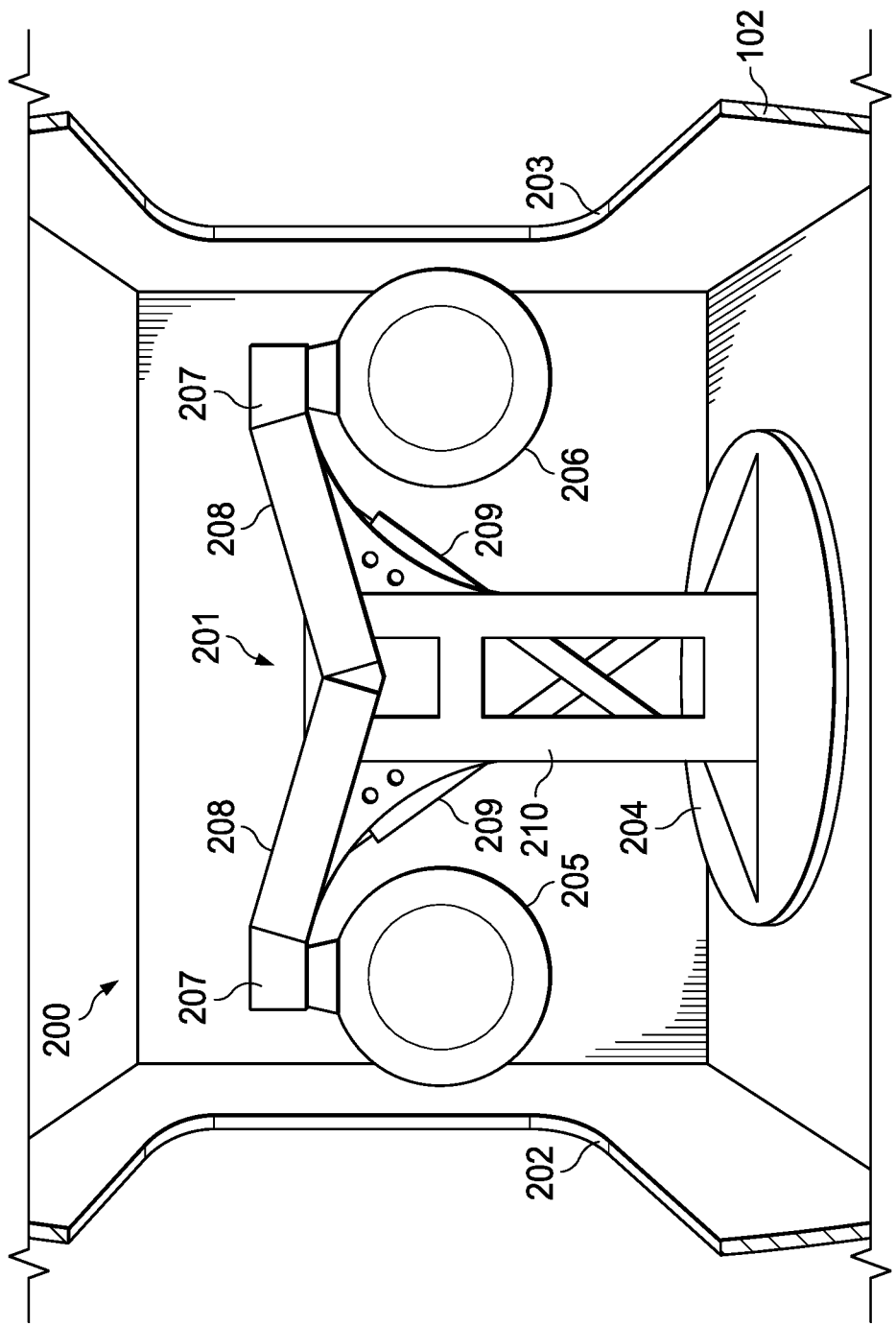

FIG. 5 is a forwarding-looking view of the internal storage area in FIG. 3.

Figure 6:
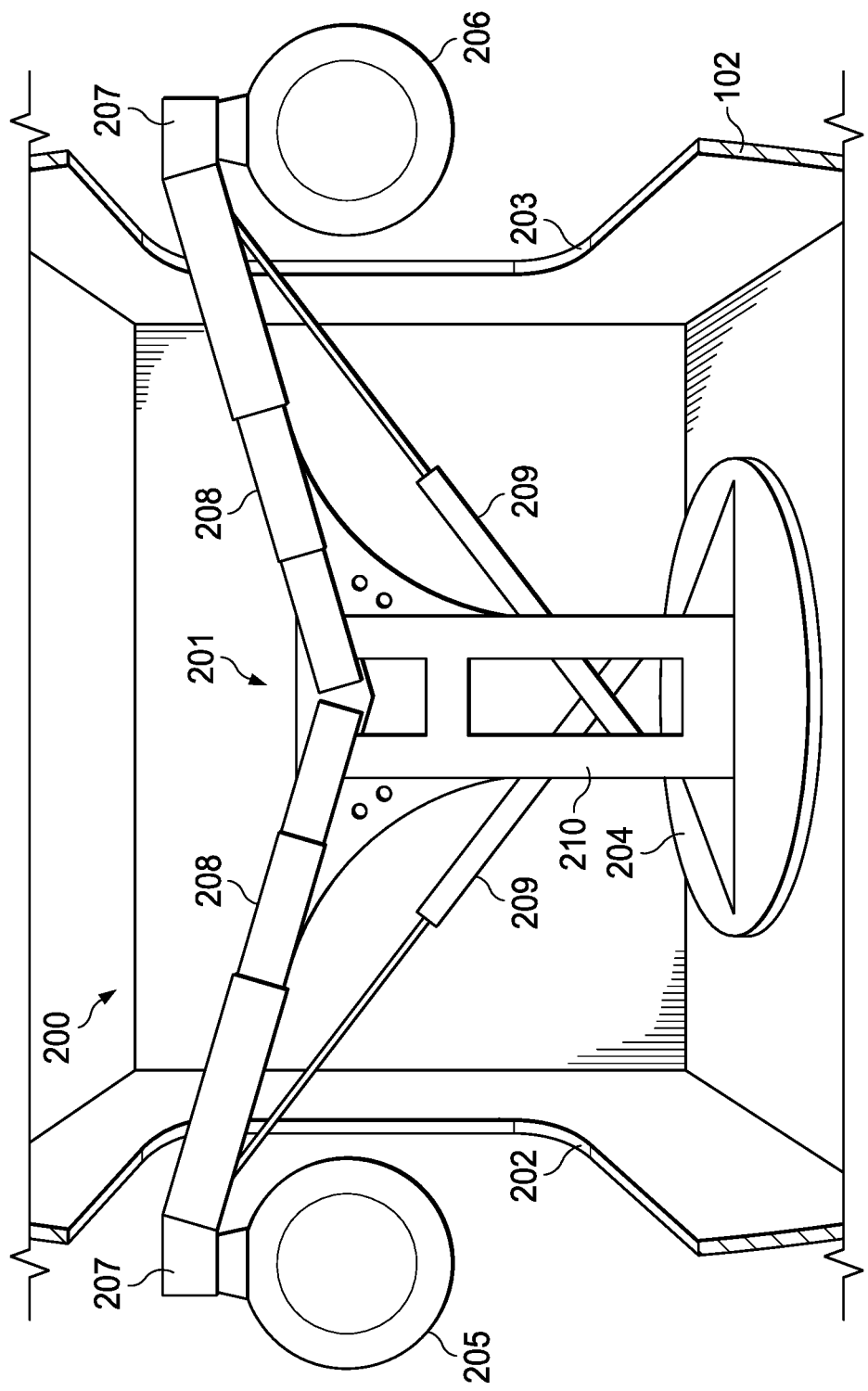

FIG. 6 is a forwarding-looking view of the internal storage area showing the payload stowage system in a deployed configuration.

Figure 7A:
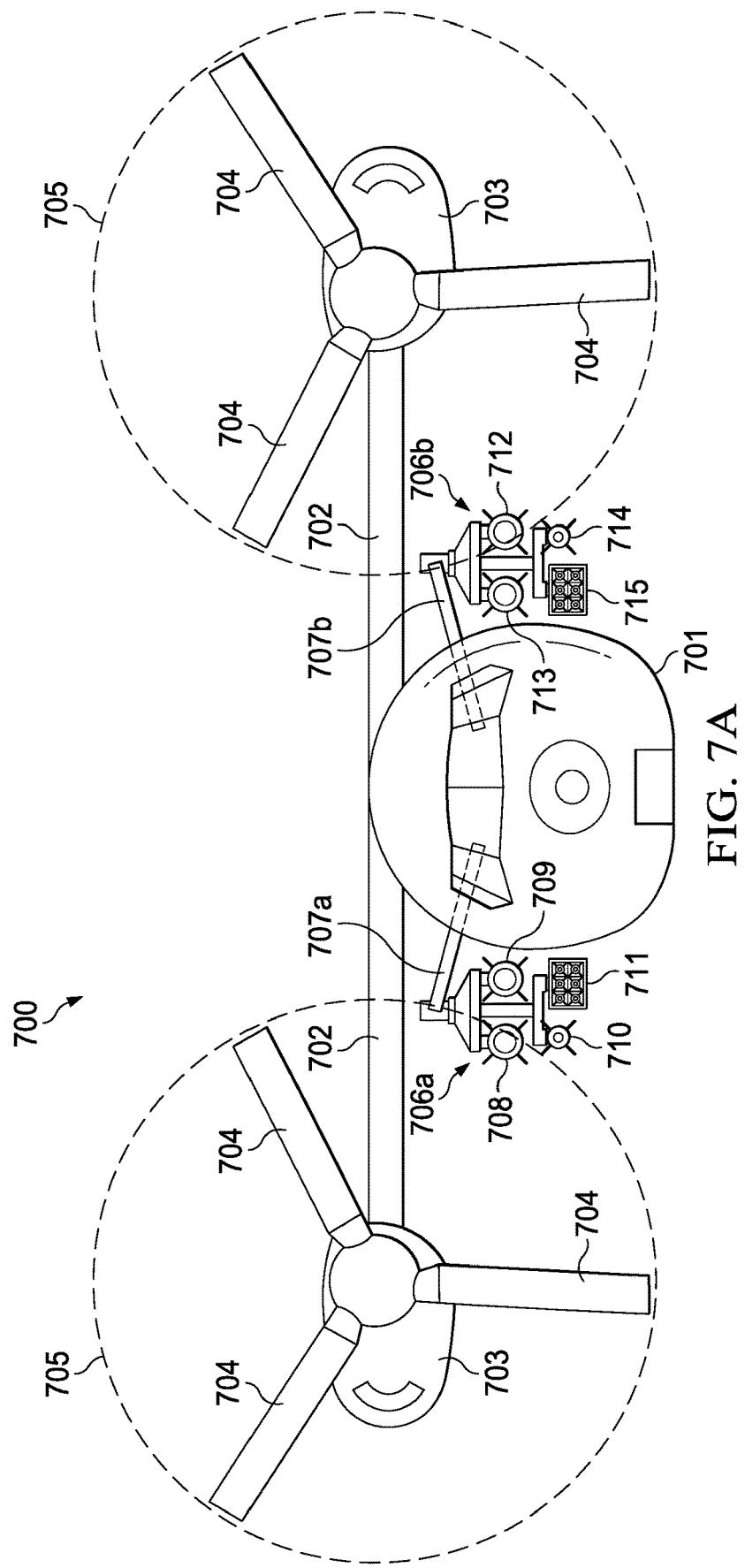

FIG. 7A illustrates a tiltrotor aircraft operating in airplane mode and having a payload stowage system deployed in a first configuration.

Figure 7B:
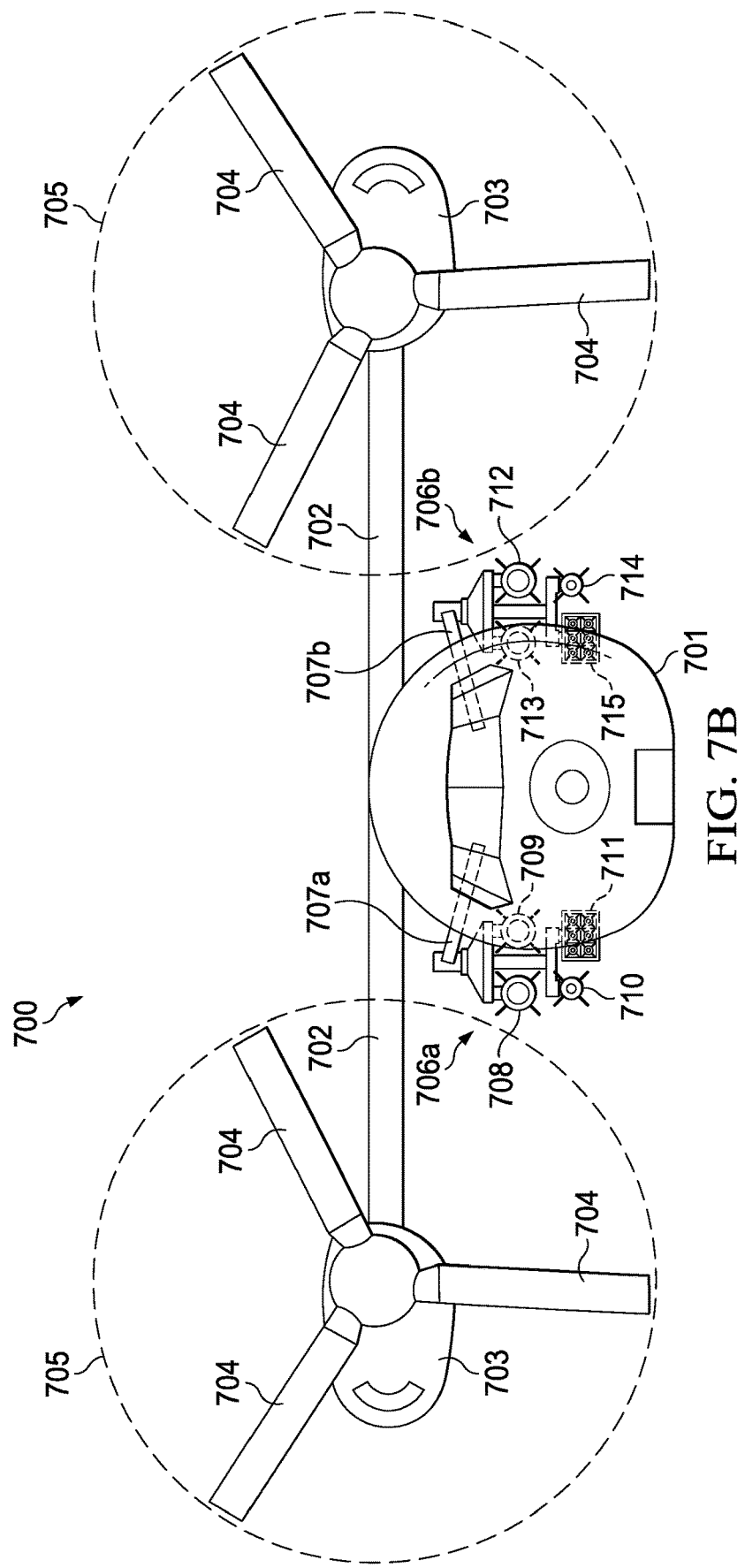

FIG. 7B illustrates a tiltrotor aircraft operating in airplane mode and having a payload stowage system deployed in a second configuration.

Figure 7C:
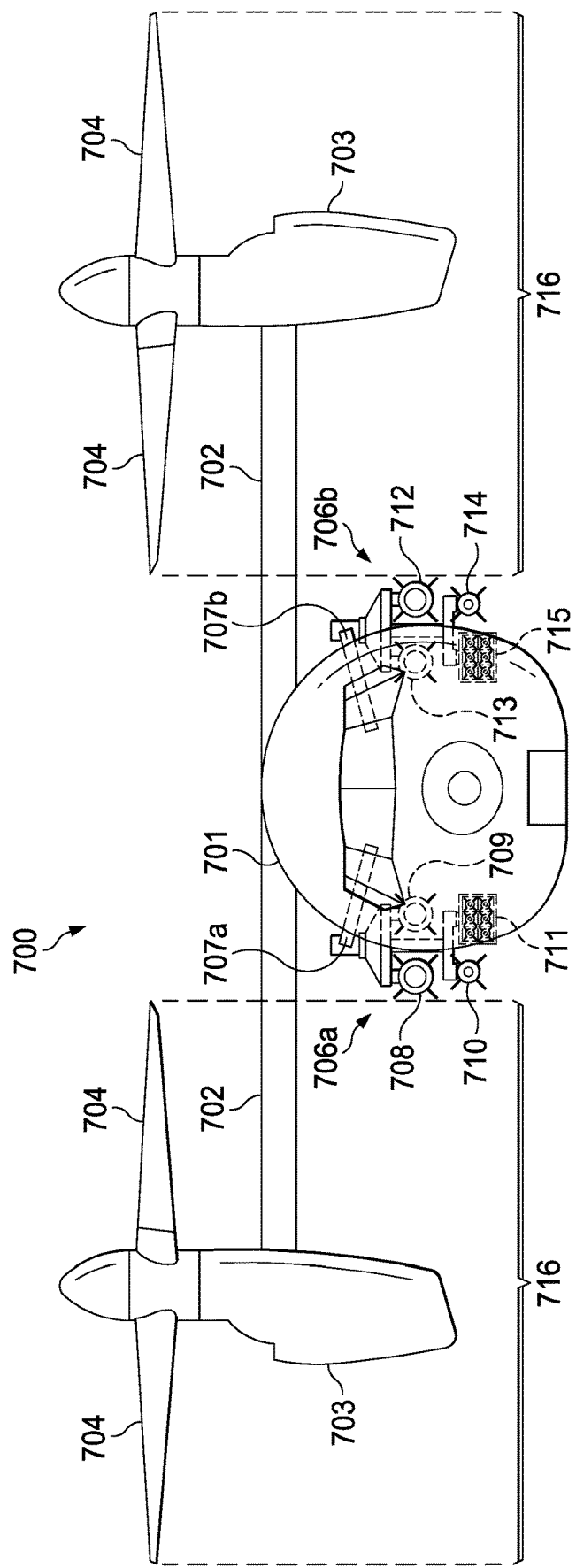

FIG. 7C illustrates a tiltrotor aircraft operating in helicopter mode and having a payload stowage system deployed in a third configuration.

Figure 8:
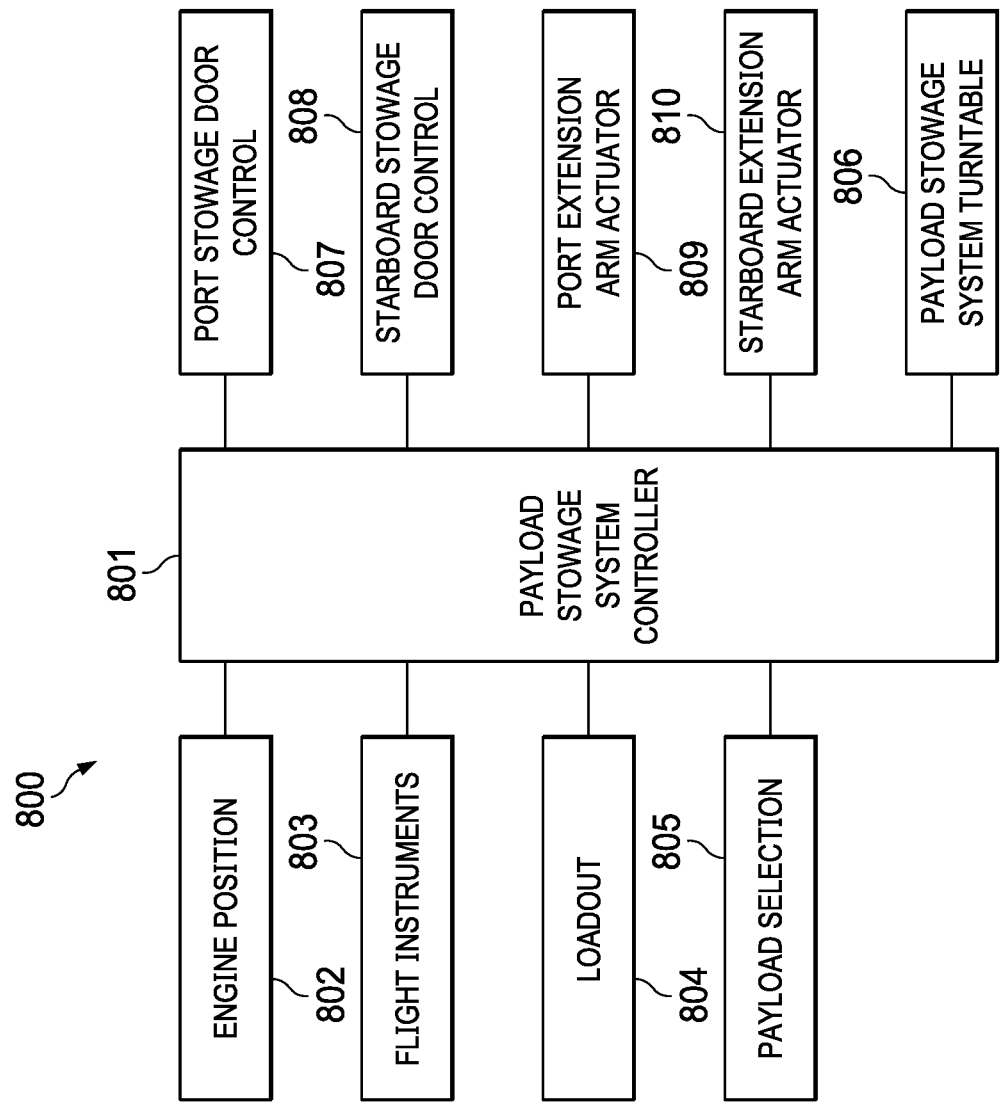

FIG. 8 is a block diagram illustrating a system for controlling an internal payload stowage system according to one embodiment.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Stowing aircraft devices, such as cameras, thermal imaging sensors, targeting pods, scientific instrumentation, loud speakers, spotlights, non-lethal law enforcement technologies, missiles, guns, or other armament, internally is an ideal configuration for a tiltrotor aircraft. Internal stowage eliminates external weapons stores and mounting points that increase aerodynamic drag, which would inhibit a tiltrotor's speed. However, there are challenges to internally stowing such devices. If internally stored, the devices must be extended into the airstream and clear of the fuselage before use. In the case of a tiltrotor aircraft, extension of internally stored devices must also be positioned to avoid the rotors when operating in airplane mode.

In one embodiment, a weapons extension mechanism precisely positions internally stored payload and/or devices between the aircraft fuselage and rotor. The weapons extension mechanism extends outward and slightly aft so that the payload and/or devices remain behind the wing's leading edge and clear of rotor flapping when in airplane mode. The mechanism may allow for multiple extension positions so that once a weapon is fired from a launcher or storage pylon, the launcher or pylon can be extended further or withdrawn to position additional weapons in a launch position.

Stowing forward-firing weapons internally raises safety concerns since the weapons in the stored position would be facing the flight crew. This can be addressed by placing a deflection bulkhead in front of the weapons and/or by using safety measures in the weapon itself, such as using fire/explosion-resistant fuel to avoid accidental ignition. In another embodiment, the entire stowage mechanism may rotate 90 degrees when stowed so that weapons point outward and away from the flight crew during storage. The weapons extension mechanism may also be configured to keep weapons in an outward-facing position and only rotate weapons forward when they are to be deployed outside the aircraft. Furthermore, a weapons system that is rotated 90 degrees for safety also allows the operational capability to position optics, munitions, or sensors perpendicular to the direction of flight, which may be beneficial in orbiting flight profiles.

FIG. 1 illustrates an aircraft 101 that may be used with some embodiments of an internal payload stowage system as disclosed herein. Aircraft 101 may include fuselage 102, landing gear 103, and wings 104. A propulsion system 105 is positioned on the ends of wings 104. Each propulsion system 105 includes an engine 106 and a proprotor 107 with a plurality of rotor blades 108. Engine 106 may rotate proprotor 107 and blades 108. Proprotor 107 may include a control system for selectively controlling the pitch of each blade 108 to control the direction, thrust, and lift of aircraft 101. Although FIG. 1 shows aircraft 101 in a helicopter mode wherein proprotors 107 are positioned substantially vertical to provide a lifting thrust. It will be understood that in other embodiments, aircraft 101 may operate in an airplane mode wherein proprotors 107 are positioned substantially horizontal to provide a forward thrust. Proprotors 107 may also move between the vertical and horizontal positions during flight as aircraft 101 transitions between a helicopter mode and an airplane mode. Wings 104 may provide lift to aircraft 101 in certain flight modes (e.g., during forward flight) in addition to supporting propulsion systems 105. Control surfaces 109 on wing 104 and/or control surfaces 110 are used to adjust the attitude of aircraft 101 around the pitch, roll, and yaw axes while in airplane mode. Control surfaces 109 and 110 may be, for example, ailerons, flaps, slats, spoilers, elevators, or rudders.

Doors 111 enclose an internal stowage area within aircraft 101. Doors 111 may be any appropriate type or shape that provides a clean aerodynamic surface on aircraft 101, such as bifurcated, sliding, hinged, accordion, or roll-up doors. By storing payload and other devices internally, no mounting hardpoints or rails are required on fuselage 102, which reduces overall drag for aircraft 101. Although FIG. 1 illustrates a tiltrotor aircraft 101, it will be understood that the internal payload stowage system disclosed herein may be used with any aircraft, including fixed wing, rotorcraft, commercial, military, or civilian. Moreover, although only one internal storage area door 111 is illustrated in FIG. 1, it will be understood that an aircraft may have multiple openings to the internal storage area, such as doors on opposite sides of the aircraft 101.

FIG. 2 is a side-view of an aircraft illustrating an internal storage area 200 having a payload stowage system 201. Openings 202 and 203 are in the fuselage on opposite sides of the aircraft. Openings 202 and 203 expose internal storage area 200 to the exterior of the aircraft. Internal storage area 200 may be enclosed and protected from the airstream using doors (e.g., doors 111, FIG. 1). Payload stowage system 201 has a rotatable base 204 mounted on the aircraft. Payload stowage system 201 is shown in a stored position wherein payload 205 and 206 are oriented perpendicular to the aircraft. Payload 205 and 206 are generically shown as pods in FIG. 2; however, it will be understood that payload 205 and 206 may be cameras, thermal imaging sensors, targeting pods, scientific instrumentation, loud speakers, spotlights, non-lethal law enforcement technologies, missiles, guns, weapons, armament, or any other device that needs to be external to an aircraft during operation. Rotatable base 204 allows the payload stowage system 201 to rotate 90 degrees (or more or less) within internal storage area 200. Payload 205 and 206 are mounted on hardpoints or rails 207, which are attached to extendable arms 208 that are driven by actuators 209. Extendable arms 208 may comprise, for example, multiple telescoping or scissoring sections. Actuators 209 may be hydraulically, pneumatically, or electrically operated. Extendable arms 208 and actuators 209 are attached to a frame 210 of payload stowage system 201.

The payload stowage system 201 rotates at least 90 degrees in either direction to convert forward-facing (or aft-facing) payload and other devices to an outward-facing position. The payload may be stored in an outward-facing position, as shown in FIG. 2, during transit, storage, or when otherwise not in use. This position also allows, for example, the aircraft doors to open so that a camera or other sensor payload would have visibility out of the aircraft without the need to extend the camera or payload into the airstream. This would be beneficial in a surveillance flight condition where the aircraft is orbiting an area and has an optical camera or thermal imager looking in to the center of the orbital pattern. This provides the aircraft the ability to maintain surveillance of an object but eliminate the need to extend the system into the airstream thus preserving aerodynamic efficiencies.

In another embodiment, hardpoints or rails 207 may have the ability to pan and tilt in any azimuth or elevation, which would allow payload 205 and 206 to be pointed in any direction either from inside or outside internal storage area 200. The payload 205 and 206 may be stabilized with a gimbal or gyroscopic device.

FIG. 3 is a side-view of the payload stowage system 201 shown in FIG. 2. Payload stowage system 201 has been rotated 90 degrees within internal storage area 200 relative the position illustrated in FIG. 2. Payload 205 and 206 are now aligned roughly parallel to the aircraft centerline. When in this position, actuators 209 can be used to extend arms 208 so that munition 205 passes through opening 202 and munition 206 passes through opening 203. In one embodiment, the payload storage system 201 rotates so that payloads 205 and 206 are oriented for forward-facing deployment or use. In another embodiment, the payload storage system 201 rotates so that payloads 205 and 206 are oriented for aft-facing deployment or use. The selection of forward-facing or aft-facing deployment may be controlled, for example, by controlling the payload stowage system 201 to rotate clockwise or counter-clockwise. This would require the payload stowage system 201 to rotate at least 90 degrees in either direction from the position shown in FIG. 2. Alternatively, if the payload stowage system 201 only rotated in one direction from the position shown in FIG. 2, then the selection of forward-facing or aft-facing deployment may be controlled by how the payloads 205 and 206 are mounted on hardpoints or rails 207.

FIG. 4 is a side-view of payload stowage system 201 in which payload 205 and 206 are removed to illustrate an arrangement of the components according to one embodiment. It will be understood that the configuration of rotatable base 204, frame 210, extendable arms 208, and actuators 209 may be modified in other embodiments based on the size or shape of internal storage area 200 and/or the size or type of payload 205 and 206.

FIG. 5 is a forwarding-looking view of internal storage area 200 in FIG. 3. Payload stowage system 201 and payload 205 and 206 are in a retracted position. Payload stowage system 201 has been rotated form a fully stowed position so that payload 205 and 206 are aligned roughly parallel to the aircraft centerline and are ready to be deployed.

FIG. 6 is a forwarding-looking view of internal storage area 200 showing payload stowage system 201 in a deployed configuration. Payload 205 and 206 have been moved to a position that is external to the aircraft. Arms 208 are extended by actuators 209 so that payload 205 and 206 are moved through opening 202 and 203 into the airstream. In this position, forward-firing type munitions or devices can be deployed, and then the pods or rails are withdrawn back into internal storage area 200. After use, payload stowage system 201 is rotated 90 degrees to a stowed position and doors are closed over openings 202 and 203 to restore an aerodynamically clean configuration on fuselage 102.

FIG. 7A illustrates an aircraft 700 having a fuselage 701 and wings 702 extending from both sides of the aircraft 700. Engines 703 are mounted on wings 702. Each engine 703 has multiple rotor blades (or propellers) 704. Engines 703 are in a forward-flight configuration, such as for a fixed-wing aircraft or a tiltrotor aircraft that is operating in airplane mode. During operation, rotor blades 704 traverse a rotor disk area defined in part by arc 705. Aircraft 700 has an internal payload stowage system for storing a payload when not in use. When needed, launchers 706a,b are extended from an interior stowage area inside aircraft 700 to an external position in the airstream along fuselage 701. Launchers 706a,b are mounted on telescoping arms 707a,b. and carry various forms of weapons 708-715.

As illustrated in FIG. 7A, when telescoping arms 707a,b are fully extended some weapons 708, 710, 712, 714 overlap rotor disk 705 at least in part. Depending on the location of the internal payload stowage system relative to rotors 704, the operation of launchers 706a,b and weapons 708-715 may be affected. If launchers 706a,b are positioned aft of rotor disk 705, then weapons 708, 710, 712, 714 may hit rotors 704 when launched. This could result in catastrophic damage to aircraft 700. On the other hand, if launchers 706a,b are positioned forward of rotor disk 705, then the exhaust from weapons 708, 710, 712, 714 may disrupt the airflow across rotors 704 if launched. Accordingly, when telescoping arms 707a,b are fully extended, some weapons 708, 710, 712, 714 may be unusable. In this configuration, weapons 708, 710, 712, 714 may be automatically placed in a safe or non-firing condition. However, when telescoping arms 707a,b are fully extended, other weapons 708, 711, 713, 715 are positioned between fuselage 701 and rotor disk 705 and can be launched without adversely affecting rotors 704.

In FIG. 7B, telescoping arms 707a,b are in a partially extended configuration so that weapons 708, 710, 712, 714 no longer overlap rotor disk 705. When telescoping arms 707a,b are only partially extended, weapons 708, 710, 712, 714 are positioned between fuselage 701 and rotor disk 705 and can be launched without adversely affecting rotors 704. However, due to the partially extended configuration shown in FIG. 7B, launchers 706a,b are partially positioned inside fuselage 701. As a result, weapons 709, 711, 713, 715 would hit aircraft 700 if launched. Accordingly, when telescoping arms 707a,b are partially extended, weapons 709, 711, 713, 715 may be unusable. In this configuration, weapons 709, 711, 713, 715 may be automatically placed in a safe or non-firing condition.

Depending on the shape of launcher 706 and the number of weapons loaded, the payload stowage system may need to operate in a fully extended or a partially extended configuration in order to deploy the weapons. These considerations may apply to other devices in addition to weapons. For example, if device 712 was a thermal imaging sensor or camera, the functionality of the device may be diminished if operated from a position behind rotor disk 705b since rotors 704b would periodically pass in front of the sensor or camera. Accordingly, use of such a device would be optimized by partially extending launcher 706b so that device 712 is positioned with an unobstructed view between fuselage 701 and rotor disk 705b.

In another embodiment, the payload stowage system may need to operate one telescoping arm 707a in a fully extended position and the other telescoping arm 707b in a partially extended position. This would allow, for example, different weapons load outs on each arm 707 and launcher 706. If telescoping arm 707a is fully extended, then weapons 709 and 711 would be available, and if telescoping arm 707b is partially extended, then weapons 712 and 714 would be available. Different weapon or device combinations may be used by individually adjusting the extension of each telescoping arm 707a and 707b. In other embodiments, only one telescoping arm 707a,b is fully or partially extended while the other arm remains fully retracted so that only one launcher 706a,b is extended outside of the aircraft. The fuselage door on the fully retracted side may remain closed to reduce drag.

FIG. 7B illustrates tiltrotor aircraft 700 operating in helicopter mode. When aircraft 700 is operating in helicopter mode, the placement of launchers 706a,b with respect to rotor disk 705 is not relevant since the rotors 704 are now positioned above the wing 702 and, therefore, above the internal payload stowage system. However, the downwash generated by rotors 704 may need to be considered for certain weapons or device 708-715 when aircraft 700 is operating in helicopter mode. For example, the rotor downwash may impact launchers 706a,b and/or certain weapons prior or during launch. Alternatively, the downwash may impact the flight path of a weapon after launch if the launcher is positioned aft of the engines 703.

Regions 716 below each engine 703 and rotor 704 are affected by rotor 704 downwash. As a result, it may be detrimental to position launchers 706*a,b* and/or weapons 708-715 in regions 716. Accordingly, in some embodiments, the internal payload stowage system may only partially extend one or both arms 707*a,b* so that launchers 706*a,b* and selected weapons 708, 710, 712, 714 are positioned between region 716 and fuselage 701 during operation. The internal payload stowage system may further extend one or both arms 707*a,b* so that launchers 706*a,b* and selected weapons 709, 711, 713, 715 are positioned between region 716 and fuselage 701 during operation.

FIG. 8 is a block diagram illustrating a system 800 for controlling an internal payload stowage system according to one embodiment. A payload stowage system controller 801 receives various inputs and controls the position of the internal payload stowage system and the deployment of the payload. Payload stowage system controller 801 may be, for example, a processor executing software instructions. Engine position sensors 802 notify payload stowage system controller 801 of the current engine configuration, such as whether the engines are oriented horizontally, vertically, or somewhere in between. Flight instruments 803 provide inputs directly or indirectly from various aircraft systems, such as an attitude-heading reference system (AHRS), air data computer (ADC), and/or navigation system. Loadout sensors 804 provide a current payload status, such as the number and type of weapons or devices loaded on the payload stowage system. Payload selection 805 provides aircrew inputs identifying desired payloads, such as a particular weapon or sensor selection. Additional inputs may be used in other configurations.

Based upon one or more of inputs 802-805, payload stowage system controller 801 controls the operation of the payload stowage system. Payload stowage system controller 801 manages the current orientation of the payload stowage system by rotating payload stowage system turntable 806 to a desired position. The payload turntable may be rotated so that weapons are pointing outward when the system is in a safe configuration. The turntable 806 is rotated to align the extendible arms with the fuselage openings when the payload is being readied for deployment. Payload stowage system controller 801 may deploy the payload symmetrically on both sides of the aircraft or the payload on each side may be individually controlled. Door controls 807 and 808 allow the payload stowage system controller 801 to open and close each door independently. Extension arm actuators 809 and 810 allow the payload stowage system controller 801 to managed how far each payload arm is extended. For example, one actuator may cause a payload arm to be fully extended and the other actuator may only partially extend the other payload arm. The position of the payload on each arm may be determined based upon aircraft flight status, engine position, payload selection, and actual payload loadout.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A deployment system, comprising:
   a rotatable frame configured to rotate between a stowed position and a deployment position;
   at least one extendible arm attached to the frame, the extendible arm configured to move between a retracted position and a plurality of extended positions, the extendible arm having a fixed end and a moving end; and
   a payload mounting point on the moving end.

2. The deployment system of claim 1, further comprising:
   at least one actuator connected between the rotatable frame and the at least one extendible arm and configured to move the extendible arm between the retracted position and the plurality of extended positions.

3. The deployment system of claim 1, further comprising:
   a payload coupled to the payload mounting point.

4. The deployment system of claim 3, wherein the payload comprises one or more of a camera, a thermal imaging sensor, a targeting pod, a loud speaker, a spotlight, and a weapon.

5. The deployment system of claim 1, wherein the at least one extendible arm is configured to move between the retracted position and the plurality of extended positions only if the rotatable frame is in the deployment position.

6. The deployment system of claim 1, further comprising:
   two extendible arms attached to the frame, the extendible arms configured to move in opposite directions symmetrically between the retracted position and the plurality of extended positions.

7. The deployment system of claim 1, further comprising:
   two extendible arms attached to the frame, the extendible arms configured to move in opposite directions asymmetrically between the retracted position and the plurality of extended positions.

8. The deployment system of claim 1, wherein the payload mounting point allows a payload to pan and tilt in azimuth and elevation.

9. An aircraft, comprising:
   an internal payload storage area;
   a rotatable deployment system mounted within the payload storage area, the rotatable deployment system comprising a frame configured to rotate between a stowed position and a deployment position;
   two extendible arms attached to the frame, each extendible arm configured to move in opposite directions between a retracted position and a plurality of extended positions, each extendible arm having a fixed end and a moving end; and
   a payload mounting point on each moving end.

10. The aircraft of claim 9, further comprising:
    actuators connected between the rotatable frame and each extendible arm and configured to move each extendible arm between the retracted position and the plurality of extended positions.

11. The aircraft of claim 9, wherein each extendible arm is configured to move between the retracted position and the plurality of extended positions only if the rotatable deployment system is in the deployment position.

12. The aircraft of claim 9, wherein the extendible arms move symmetrically.

13. The aircraft of claim 9, wherein the extendible arms move asymmetrically.

14. The aircraft of claim 9, wherein the payload mounting point allows a payload to pan and tilt in azimuth and elevation.

15. The aircraft of claim 9, further comprising:
   openings to the internal payload storage area on opposite sides of an aircraft fuselage, the openings positioned to allow the moving ends of the extendible arms to extend outside the aircraft.

16. The aircraft of claim 15, further comprising:
   a payload coupled to each payload mounting point.

17. The aircraft of claim 16, wherein the payload comprises one or more of a camera, a thermal imaging sensor, a targeting pod, a loud speaker, a spotlight, and a weapon.

18. The aircraft of claim 16, wherein a selected payload is positioned between the aircraft fuselage and a proprotor arc.

19. The aircraft of claim 16, wherein a selected payload is positioned between the aircraft fuselage and a proprotor downwash.

20. The aircraft of claim 15, further comprising:
   doors configured to cover the openings.

* * * * *